United States Patent [19]

Moffitt, Jr.

[11] 4,451,127
[45] May 29, 1984

[54] HALF-READER SUNGLASSES

[76] Inventor: Merritt L. Moffitt, Jr., 9 Weirwood Rd., Radnor, Pa. 19087

[21] Appl. No.: 245,308

[22] Filed: Mar. 19, 1981

[51] Int. Cl.³ .......................... G02C 9/00; G02C 7/02
[52] U.S. Cl. ........................................ 351/47; 351/61
[58] Field of Search ..................... 351/47, 48, 57, 58, 351/59, 61; 2/13, 432

[56] References Cited

U.S. PATENT DOCUMENTS

| | | | |
|---|---|---|---|
| 2,393,955 | 2/1946 | Baratelli et al. | 351/47 |
| 3,183,523 | 5/1965 | Harrison | 351/47 |
| 3,413,057 | 11/1968 | Carmichael | 351/57 |
| 3,741,634 | 6/1973 | Stoltze | 351/57 |
| 3,876,295 | 4/1975 | Loughner | 351/47 |

Primary Examiner—John K. Corbin
Assistant Examiner—Rodney B. Bovernick
Attorney, Agent, or Firm—John J. Simkanich

[57] ABSTRACT

A pair of clip-on sunglass lenses for use with half-frame reading glasses is provided having a pair of sun lenses attached together at their bottom juxtaposed position with a bridge piece this bridge piece having a pivot shaft; a support bracket having a pair of receiving sockets mates with this pivot shaft, this support bracket being held in position by a spring wire type clamp capable of wrapping around the frame of the glasses for positively locking the clamp and therefore the bracket to the frame of the glasses.

2 Claims, 6 Drawing Figures

HALF-READER SUNGLASSES

BACKGROUND OF THE INVENTION

This invention relates to sunglasses and especially to clip-on-type sunglasses which are intended to be mounted on a pair of prescription glasses.

Clip-on sunglasses in the past have taken one of two general configurations. The first configuration includes sun lenses which are clamped on to the prescription glass frame so that they are held to the glass frames through a pressure exerted through both the glass frame and the lens with the lens under a slight compression. Richards, U.S. Pat. No. 2,132,346 and Arbenz, U.S. Pat. No. 2,510,539 teach such clip-on sunglasses. The Richards design includes a dog leg shaped lug 15 (bracket) which enables the lenses 13 to be raised to the horizontal position before interfering with the forehead of the user and striking into the frames of the prescription glasses to which the clip-on glasses are attached.

The second configuration has been embodied in the techniques of Mosher, U.S. Pat. No. 2,687,671, Allman, U.S. Pat. No. 2,714,717, Maxson, U.S. Pat. No. 3,147,488, Blaney, U.S. Pat. No. 3,254,932, Loughner, U.S. Pat. No. 3,876,295 and Lemelson, U.S. Pat. No. 4,217,037. All teach clip-on sunglasses where the attachment means provides a lateral pinching force against either the prescription glass frame or the prescription lens which subjects the frame or lens to torsional or compression forces. These latter clip-on sunglasses do not positively lock on to the prescription glass frames.

An object of the present invention is to provide a clip-on structure for sunglass lenses for half frame reading glasses.

Another object is to provide such clip-on sunglasses with a spring clamp mechanism which positively locks about the frame structure.

Another object of the subject invention is to provide a pivotal bracket which enables the sunglass lenses to be rotated a full 180° from one vertical position to another vertical position, easily, without binding or interfering with the face of the wearer or the structure of the prescription half-reader glasses to which they are attached.

SUMMARY OF THE INVENTION

The objects of this invention can be realized with a pair of clip-on sunglasses having a wire clamp-on-type wire bracket having turns therein for wrapping around and securely holding to the prescription glass frame at either the bridge area or the peripheral area of the prescription glass frames.

A lens support bracket is attached to the wire clamp-on-type bracket for being positioned above the bridge of the prescription glass frame. This bracket includes a pair of bifurcated protrusions each forming a separate receiving socket for acting as a journal for an insertable shaft.

A pair of sunglass lenses are secured in their bottom juxtaposed area by a bridge piece having an opening traversed by a pivot shaft. This pivot shaft is intended for mating with the receiving sockets of the support bracket. The structure is symmetrical, such that the lenses may be rotated in excess of 180° of the pivot shaft about the support bracket without interfering with the prescription glass frames or the face of the wearer.

DESCRIPTION OF THE DRAWINGS

The features, advantages and operation of the half-reader sunglasses invention will be readily understood from a reading of the following detailed description of the invention in conjunction with the accompanying drawing in which like numerals refer to like elements and in which.

DETAILED DESCRIPTION OF THE INVENTION

Figure 1A:
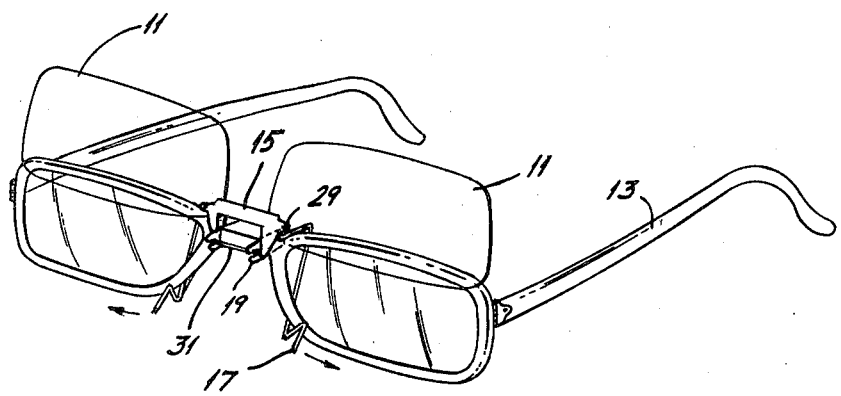
FIG. 1a shows a perspective frontal view of the half-reader sunglasses installed on the reading prescription glass frames at the nose bridge area.

A pair of clip-on type sunglass lenses for use with half-frame reading glasses 13 are shown attached to such half-frame reading glasses 13 shown in a front perspective view, FIG. 1a. These sunglasses include a pair of sun lenses 11 of rectangular, elongate or other common shape. These lenses 11 are attached in a juxtaposed normal position by a bridge piece 15 at a spacing which is readily positionable before both eyes of the wearer. A spring wire clamp-on type bracket 17 is secured to the bridge area of the half-reader frame 13.

A support bracket 19 carries the bridge piece 15 while being mounted on the wire bracket 17.

Wire bracket 17 is made of spring steel and extends outwardly from the support bracket 19 parallel to the bottom of the lenses 11 on either side of the support bracket 19. It then makes a backwardly bend and then a downwardly bend a distance beyond the bottom of the half-frame reading glasses 13 bridge area outwardly in an "S" turn as described in detail below. By torquing the wire bracket 17 gently it is able to slip over and clamp around the half-frame 13 at the nose or bridge area.

Figure 1B:
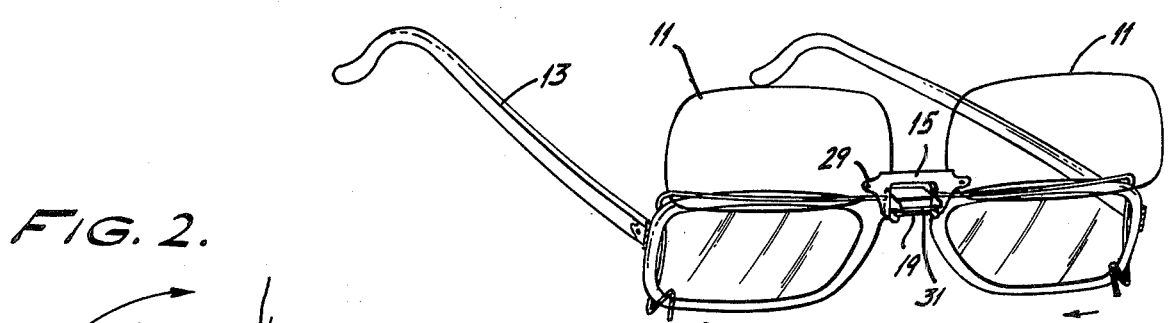
FIG. 1b shows an alternate embodiment for the half-reader clip-on sunglasses with the wire clamp-on-type bracket extending about the peripheral sides of the prescription half-reader glass frames.

FIG. 1b shows the half-reader sunglasses of the invention where the bracket 17 extends along the entire top of the prescription lenses of the half-frame reading glasses 13 and then downwardly around the periphery of the frame 13. In this embodiment the lenses 11, bridge piece 15 and support bracket 19 are identical to that of the embodiment of FIG. 1a.

Figure 2:
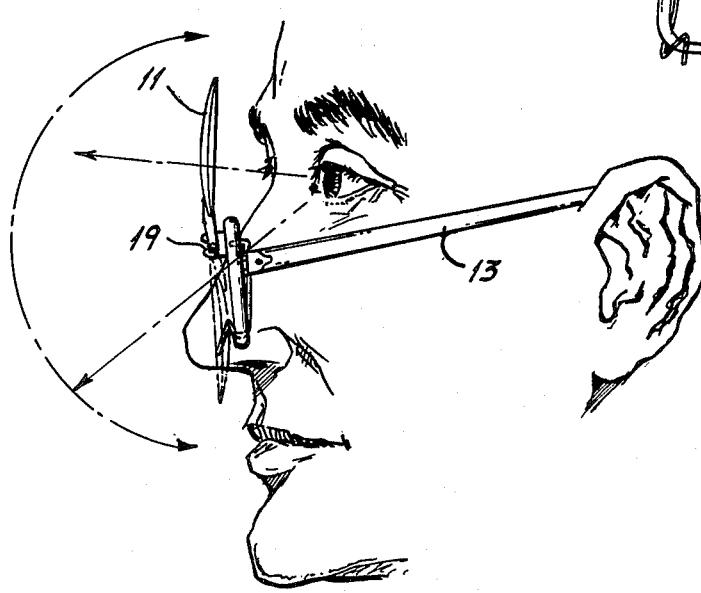
FIG. 2 shows a side view of the clip-on sunglasses of the subject invention with the lenses in each of the two probable operating positions.

A side view of the invention installed on the half-frame reading glasses 13 is shown in FIG. 2. Here the wire clamp-on bracket 17 is viewed as wrapping around the half-frame 13 reading glasses from the top, downwardly, on the side of the frame 13 at the bridge area and then around and outwardly on the bottom side of the glasses 13. The support bracket 19 extends above and in front of the nose bridge area of the half-frames 13 outwardly therefrom and in approximate perpendicular position thereto. The lenses 11 may be rotated in excess of 180° from the vertically up position to the vertically down position where both positions lie in the same vertical plane extending in front of the half-frame reading glasses 13 as seen in FIG. 2. The wearer may view distant objects by looking over the half-frame reading glasses 13 and through the sunlenses 11. While the viewer may also look through the reading glasses 13 and through the sun lenses 11 when they are rotated to the downward vertical position.

Figure 3:
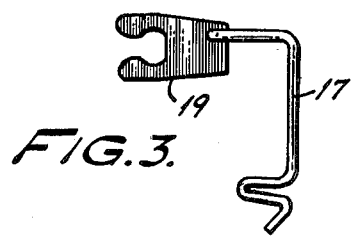
FIG. 3 shows a side elevation of the wire-type clamp-on bracket and lens support bracket portions of the invention.
Figure 3A:
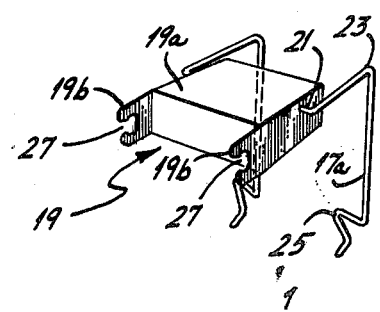
FIG. 3a shows a perspective view of the brackets shown in FIG. 3.

The support bracket 19 and wire clamp bracket 17 are shown in detail in a side view in FIG. 3 and in a perspective view in FIG. 3a. The clamp-on bracket 17 is made of spring steel wire having a round configuration. Alternate materials, however, such as plastic, other metals, etc. can be used for this bracket 17. This wire 17 extends outwardly from the support bracket 19 on either side and has a first bend section 21, which is followed by a second bend 23. The third or "S" bend 25 is located at the end of the wire for clamping around and holding to the bottom portion of the half-reader frames 13. The shape and function of either sides of the wire 17a and 17b are identical. These sides 17a, 17b extend symmetrically about the support bracket 19.

The support bracket 19 includes a trapezoidal section 19a through which the wire bracket 17 extends and two protrusions 19b at either end thereof. These protrusions are bifurcated to form each a receiving socket 27 which acts as a journal.

Figure 4:
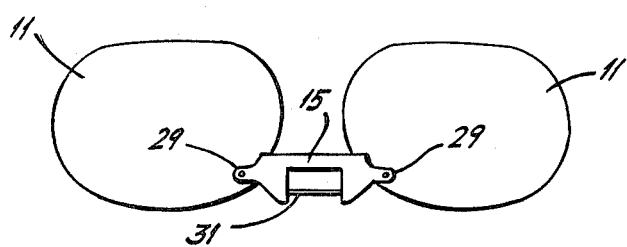
FIG. 4 shows the sun lenses and bridge piece and pivotal shaft portion of the invention.

The lenses 11, FIG. 4, are held together by the bridge piece 15. This bridge piece 15 approaches the shape of a rectangular plate which includes a pair of tabs 29, one each extending from opposing ends thereof, and onto a connection with one of the respective lens 11. A rectangular cut out section in this bridge piece 15 provides an opening across which a pivot shaft 31 extends. This pivot shaft 31 is of a size and shape for mating with the receiving sockets 27 of the support bracket 19. The opening in the bridge piece 15 is of sufficiently large size to allow the lenses 11 to be freely pivoted on the bracket 19 and for the bridge piece 15 to clear the bifurcated ends 19b of the support bracket 19.

The support bracket 19 can be made of molded plastic as can be the lenses 11 and the bridge piece 15 with its pivot shaft 31. When the lenses 11 are made of glass, the bridge piece 15 is either glued or attached to the lenses 11 with jeweler's screws or rivets. Polyethylene or nylon materials may be used for constructing the support bracket 19 and the bridge piece 15 with its pivot shaft 31, as alternatives to plastic materials recited above. Certain lighter metals such as aluminum can also be considered.

Changes can be made to the above-described half-reader clip-on sunglasses without departing from the intent and scope thereof, many different embodiments can be envisioned. Therefore, it is intended that all matter contained in the above description as shown in accompanying drawings shall be interpreted as illustrative and not be taken in the limiting sense.

What is claimed:

1. Clip-on sunglasses for half-reader eye glass frames, comprising:
    a pair of juxtaposed sun lenses;
    a rectangular plate having a pair of tabs, one each extending longitudinally outwardly from said opposite shorter ends of said plate, each tab engaging one of said lenses at the nose bridge adjacent portion thereof;
    a rectangular cut-out section in said plate extending inwardly from a longer side of said plate;
    a pivot shaft extending across the opening provided by said cut-out section and attached to either end of said plate and extending parallel thereto;
    a bracket for holding said rectangular plate allowing for the pivoting of said rectangular plate and said a full 180° rotation thereby pivoting said sun lenses from one position to another lying in the same plate, said bracket being a box-like, body with trapezoidally-shaped configuration;
    a first and second protrusions, extending outwardly, in parallel, from a respective either end of said bracket, each said protrusion being bifurcated to form in each a receiving socket which operates as a journal to receive, hold and allow rotation of said pivot shaft;
    a wire clamp for attaching said to said half-reader eye glass frames, said wire clamp wrapping around said eye glass frames, and being attached to said bracket by passing completely therethrough, parallel to said pivot shaft.

2. The clip-on sun glasses of claim 1 wherein said rectangular plate said pivot shaft and said tabs are material from the group nylon and plastic.

* * * * *

UNITED STATES PATENT AND TRADEMARK OFFICE
CERTIFICATE OF CORRECTION

PATENT NO. : 4,451,127
DATED : May 29, 1984
INVENTOR(S) : Merritt L. Moffitt, Jr.

It is certified that error appears in the above-identified patent and that said Letters Patent is hereby corrected as shown below:

Col. 4, line 30 "plate" should be - - plane - -.

Signed and Sealed this

Twenty-third Day of October 1984

[SEAL]

Attest:

GERALD J. MOSSINGHOFF

Attesting Officer    Commissioner of Patents and Trademarks